Figure 1:
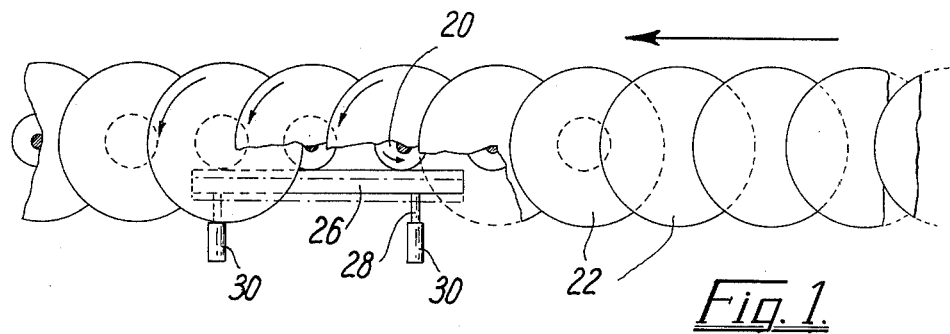

United States Patent [19]
Nielsen

[11] 4,081,071
[45] Mar. 28, 1978

[54] CONVEYOR SYSTEMS
[75] Inventor: Jacob August Nielsen, Viby J., Denmark
[73] Assignee: Kosan Crisplant A/S, Denmark
[21] Appl. No.: 614,941
[22] Filed: Sep. 19, 1975
[30] Foreign Application Priority Data
Sep. 23, 1974 United Kingdom ............... 41239/74
[51] Int. Cl.² ............................................. B65G 43/00
[52] U.S. Cl. .................................. 198/365; 198/796; 214/11 R
[58] Field of Search .................... 198/38, 42, 181, 182, 198/802, 365, 796, 793; 214/11 R
[56] References Cited
U.S. PATENT DOCUMENTS
426,890  4/1890  Westphal ........................ 198/181 X
3,297,144  1/1967  Michaelson et al. ................ 198/181

Primary Examiner—Evon C. Blunk
Assistant Examiner—Douglas D. Watts
Attorney, Agent, or Firm—Craig & Antonelli

[57] ABSTRACT

A sorting conveyor made as a train of consecutive, closely juxtaposed article carrier elements capable of carrying articles each resting on the top side of one or more carrier elements, the carrier elements being constituted by rotatably supported discs each arranged so as to partly overlap the preceding or following disc and be partly overlapped by the respective following or preceding disc, whereby when the discs are caused to rotate at a selected discharge station along the conveyor the article resting thereon will be caused to move laterally off the conveyor.

11 Claims, 10 Drawing Figures

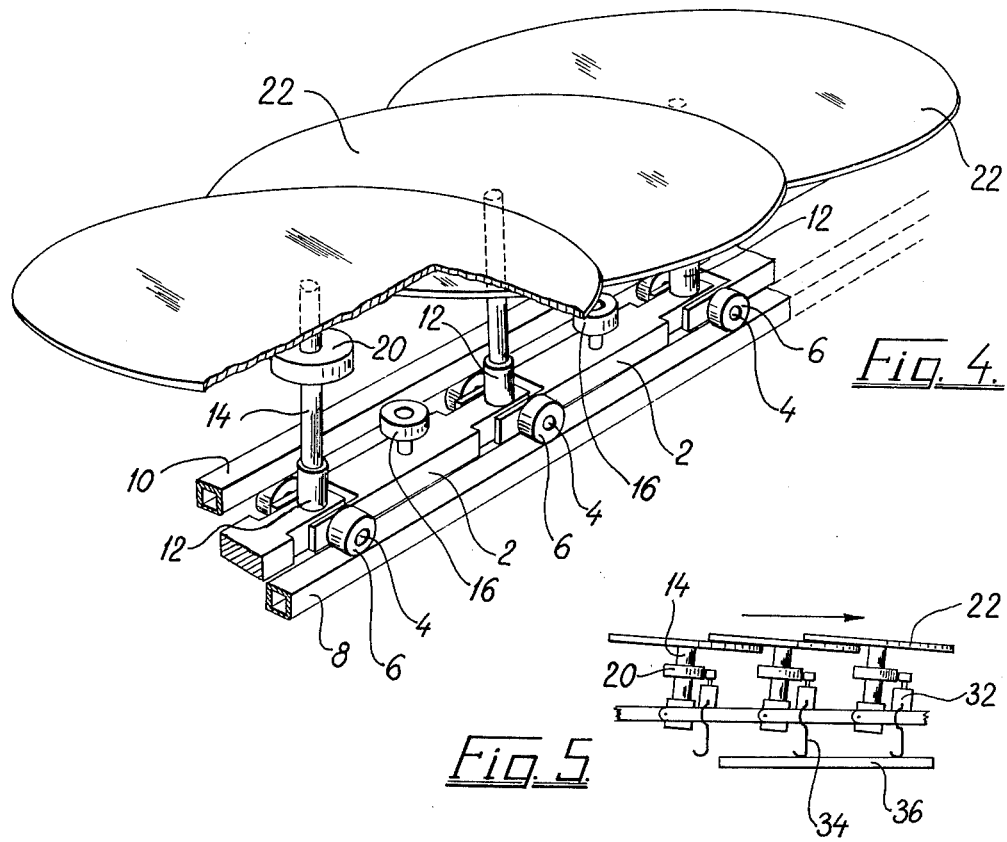
Fig. 4.
Fig. 5.
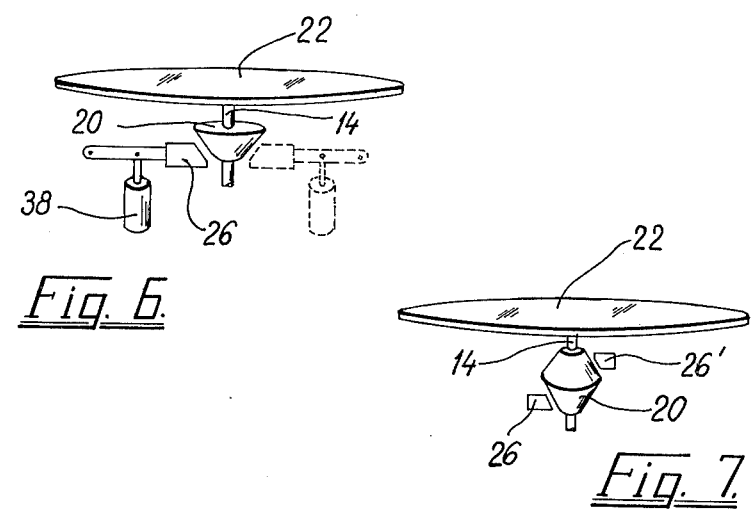
Fig. 6.
Fig. 7.

CONVEYOR SYSTEMS

The present invention relates to a conveyor arrangement for conveying and unloading articles, comprising a train of consecutive article carrier elements movable in a main conveying direction, each of said carrier elements being provided with article supporting means arranged so as to be selectively movable crosswise to said main conveying direction for effecting unloading of an article resting thereon. Especially in sorting conveyors it is desired to be able to cause unloading of articles transversely from the conveyor at any selected unloading station located one after the other along the length of the conveyor. For effecting the transverse unloading or diversion it is known to use diverter means located adjacent the different unloading stations so as to be selectively operable to push the conveyed articles laterally off the conveyor. It is also known — and in practice advantageous — to let the diverter arrangement be associated with the conveyor itself, viz. to let the conveyor consist of a train of carrier elements having article supporting means which are each operable, when passing a selected unloading station, to cause an article resting thereon to be displaced laterally from the conveyor.

Conveyors of the latter type, to which also the invention relates, have been made primarily as the so-called tilting slat conveyors, comprising a belt or train of transverse, horizontal slats which are selectively tiltable so as to cause an article resting thereon to slide down along the tilted slat or slats for lateral discharge from the conveyor belt. Alternatively it has been suggested to make use of a train of conveyor links each made as a "cross conveyor," i.e. a conveyor unit operable to actively convey an article resting thereon in the transverse direction of the main direction of the sorter conveyor, these cross conveyors substituting the said slats and each being made as a small belt conveyor including an endless conveyor belt having an upper article carrier run and a lower return run, as disclosed e.g. in commonly assigned U.S. application Ser. No. 270,030, now abandoned. It is the purpose of the invention to provide a conveyor of the said type in which the article carrier elements may be of a simple construction.

According to the invention the article supporting means are constituted by rotary disc members mounted so as to overlap each other in such a manner that each disc is partly covered by a part of the preceding or the following disc, means being provided for rotating the discs selectively for effecting said unloading of an article resting on one or more of the discs. In this manner, when one or more consecutive discs are rotated the major part of their exposed surfaces will be moved generally in a direction crosswise to the moving direction of the conveyor, and they will be operable to hereby cause a selective, transverse unloading of an article from the conveyor. The discs are very easy to cause to rotate as required, whereby the structural arrangement may be made extremely simple.

When two or more rows of the said interoverlapping discs are arranged parallel with and close to each other a lateral displacement of an article by the rotation of the discs will result in the article being moved from one disc row to the next, and so forth, i.e. the article is moved generally crosswise of the consecutive disc rows, whereby a separate conveying movement is produced, irrespective of whether the disc rows themselves are moved or not moved. According to another aspect of the invention, therefore, there is provided a conveyor comprising a plurality of rows of the said interoverlapping discs, which, when rotated, will cause articles resting thereon to be moved generally in a direction crosswise to the direction of the disc rows.

Figure 2:
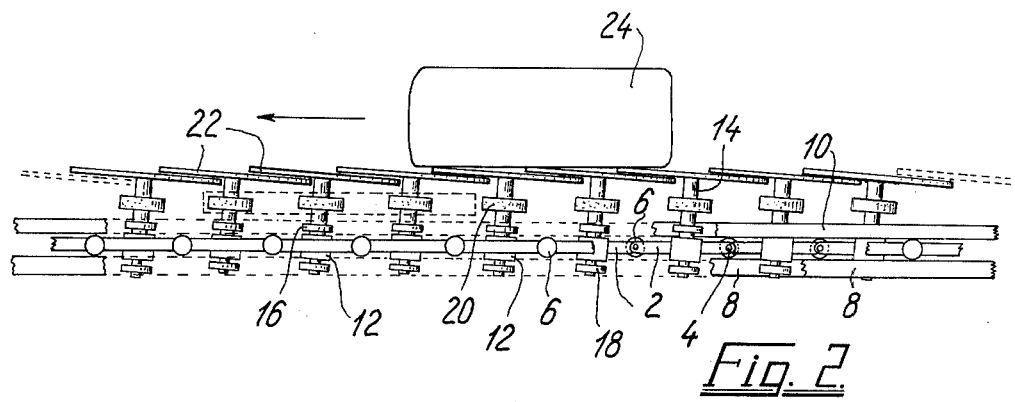
Figure 3:
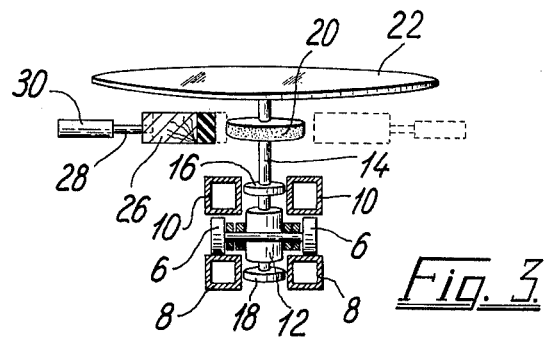
Figure 8:
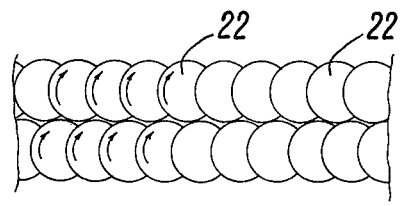
Figure 9:
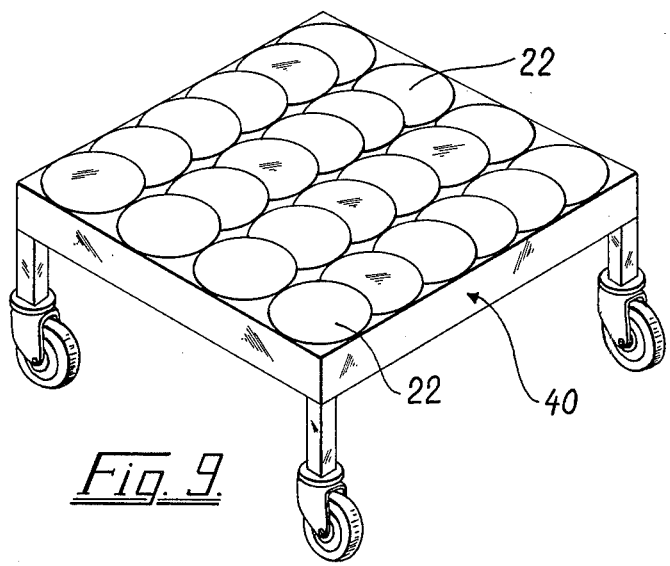
Figure 10:
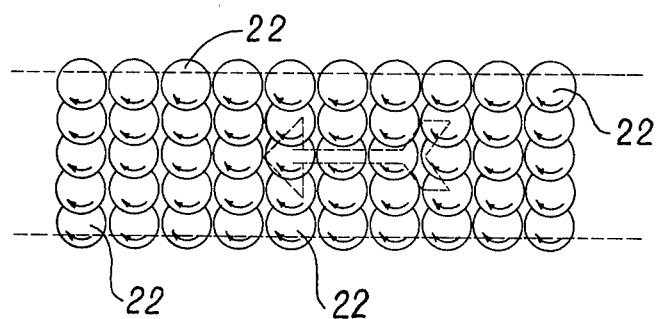

The invention is described in more detail in the following, reference being made to the accompanying drawing, in which:

FIG. 1 is a top view of a sectional length of a conveyor according to the invention, FIG. 2 is a side view thereof, FIG. 3 is an end view thereof, FIG. 4 is a perspective view of a section of a slightly modified conveyor, FIG. 5 is a schematic side view illustrating a further modification, FIGS. 6 and 7 are views corresponding to FIG. 3, but showing modified embodiments, FIG. 8 is a top view of a double disc row conveyor, FIG. 9 is a perspective view of a non-endless conveyor according to the invention, and FIG. 10 is a top view of a stationary conveyor according to the invention.

The conveyor shown is built as an endless train of chain links 2 interconnected by means of pivot joints 4 enabling the chain to be driven about end sprockets (not shown). In each pivot joint 4 is mounted a pair of rollers 6 supported on rails 8 so as to be movable along these rails underneath a pair of upper rails 10. With each link 2 is rigidly associated a slightly inclined bearing bushing 12 serving to rotatably hold a shaft 14 extending upwardly and downwardly from the bushing 12 so as to be slightly inclined in the moving direction of the conveyor. Above and underneath the bearing bushing 12 the shaft 14 is provided with a freely rotatable roller 16 and 18, respectively, these rollers being located between the lateral sides of the rails 10 and 8, respectively, so as to guide the belt link in the longitudinal direction of the conveyor.

Above the rails 10 the shaft 14 is provided with a rigidly secured friction wheel 20, and on the top of the shaft 14 is secured a disc 22 of a relatively large diameter. As clearly shown in the drawing the slightly inclined discs 22 partially overlap each other so as to prevent a practically continuous carrier surface for articles 24 resting thereon. The discs 22 are relatively thin, whereby they can overlap each other with a small inclination only and thus present a practically continuous horizontal carrier surface operable to carry an article or parcel 24 extending over several discs 22.

The shafts 14 may be rotatable with a certain friction in the bearings 12, so that normally by the movement of the disc train the discs will not rotate, and the articles 24 will remain safely rested on the discs 22.

Adjacent or along each unloading station of the conveyor system is provided a friction rack 26 extending generally in the longitudinal direction of the conveyor and being mounted so as to be parallelly displaceable between an operative position, shown in full lines in FIG. 1, in which it cooperates with the friction wheels 20 as these are moved along the rack, and an inoperative position in which it is not engaged by the friction wheels. The rack 26 may be mounted on the piston rods 28 of stationary cylinders 30 so as to be shiftable between the two positions by actuation of the cylinders 30.

When an article 24 is to be discharged from the conveyor at a selected unloading station the rack 26 in this station is shifted into its operative position, whereby the friction wheels 20 roll along the rack and thus cause the associated shafts 14 and discs 22 to rotate correspondingly, as indicated by arrows in FIG. 1. Hereby the major part of the exposed disc surfaces will be moved generally in the cross direction shown by the arrows, and since the article is rested mainly on the uppermost edges or surface portions of the discs, it will be gently diverted from the conveyor by the rotation of the discs. Of course, the diversion will take place to the other side if the main moving direction of the conveyor is opposite, from the left towards the right, or if the rack 26 is placed at the other side of the conveyor. It will be understood that two racks 26 may well be placed immediately opposed to each other so as to be operable to effect diversion selectively to one side or the other of the conveyor.

The conveyor is illustrated as being adapted to pass over sprockets rotating in a vertical plane, but it will be appreciated that the conveyor links are easily so adapted that the conveyor is able to pass around sprockets rotating in a horizontal plane, i.e. so as to make the conveyor operative for article carrying purposes along both the forward and return run thereof.

The speed with which the crosswise diversion of the articles is effected will be depending of the diameter of the friction wheels 20. Thus, a simplification is obtainable by letting the racks 26 engage the periphery of the discs 22 whereby the pulleys 20 can be avoided. With this arrangement, however, the discs will rotate relatively slowly, and the discharge stations would then need to be of a length larger than desired.

In FIG. 2 the shafts 14 are shown mounted midways on the links 2. In practice, however, it should be preferred to mount the shafts adjacent one end of the respective links for facilitating the movement of the conveyor through vertical curves, such as about said end sprockets, or through horizontal curves without the consecutive overlapping discs jamming with each other in the curves. FIG. 4 is an illustration of a preferred embodiment in which the shaft 14 is mounted in a bearing bushing 12 adjacent one end of the link 2, the rollers 16 and 18 being mounted on a separate shaft 17; furthermore it is illustrated in FIG. 4 that it will be sufficient to make use of one pair of diagonally opposed guiding rails 8 and 10 when the opposed rollers 6 engage with the top side of the rail 8 and the bottom side of the rail 10, respectively, and when the opposed rollers 16 and 18 engage with the innermost sides of the same rails 8 and 10, respectively. It will be readily understood, however, that the invention is not limited to any particular manner of guiding the shafts 14 in the main conveying direction of the conveyor, and of course the chain links may be guided along the rails 8 and 10 or any other suitable guiding structure without necessarily being provided with the support rollers 6 and 16,18. What is important is that the shafts 14 are guided parallel to each other, and obviously this will be obtainable in a wide variety of manners.

The discs themselves may be made of any convenient material such as plywood. If made of rubber or another resilient material they may be allowed to bend somewhat by the weight of the articles, whereby in order to provide space for this bending, the underlying disc should preferably have enlarged distance from the overlying disc, i.e. the discs should have increased inclination.

The invention is not limited to any particular manner of causing the discs 22 to rotate for effecting the diversion movement of the articles 22. Thus, the single links or shafts might even be provided with individual driving motors, as shown at 32 in FIG. 5, energized by means of sliding shoes 34 and contact rail means 36. FIG. 6, compared with FIG. 3, shows the modification that the underside of the pulley 20 is conically shaped while the rack 26, by means of a working cylinder 38, is shiftable in the vertical direction between a lower inoperative position and a raised operative position in which it cooperates with the said underside of the pulley 20. It will be readily understood that an equivalent shift will be obtainable if the rack is stationary and the pulley 20 is operable to be moved axially along the shaft 14 between an upper inoperative position and a lower operative position in rolling engagement with the rack. In the latter arrangement, as shown in FIG. 7, the pulley 20 may be shaped as a double cone and a further rack 26' should be provided above the pulley at the other side of the shaft 14, if it is desired to maintain the possibility of causing the discs to effect discharge selectively to either of the respective opposite sides of the conveyor; the pulley 20, of course, should then be shiftable between three different positions of which the intermediate position is the inoperative position. The shift of the pulley may be effected by any suitable means such as shiftable, stationary guiding cam means (not shown) selectively operable to force the pulley into engagement with the desired rack 26 or 26' and to hold it in this engagement during the passage of the pulley through the particular unloading station. Of course, this holding may alternatively be effected by snap lock means or a similar arrangement located on each of the moved links or elements.

A further possibility, which is not illustrated in the drawing, would be to let the friction wheels roll in permanent driving connection with elongated rack means and be connected to their respective shafts 14 by means of a suitable clutch connection which is shiftable between operation and non-operation by means of selectively operable actuator means located adjacent each of the unloading stations, principally exactly as disclosed in commonly assigned U.S. Patent application Ser. No. 502,879. Now U.S. Pat. No. 3,912,071 which relates to the controlling of an analogous type of conveyor. The said clutch connection may consist in the pulley 20 being axially displaceable on the shafts 14 between a lower position in which they are freely rotatable on the shafts and a raised position in which they engage the shafts so as to become in driving connection therewith.

It will be readily understood that the main feature of the invention is the provision of simple article carrier elements which are selectively operable to laterally discharge the articles with the use of simple movement control means. In almost every other respect, as far as the manner of using the conveyor and controlling the discharge operations thereof e.g. in response to automatical or manual distination code settings for the articles to be handled, the conveyor will correspond to the said known conveyors of the tiltable slat type or the cross conveyor belt type. For example, like in these conveyors it will be possible to control the discharging of an article by cascade actuation of as many cross conveying elements as occupied by the particular article, reference here being made to the U.S. Pat. Nos. 3,224,557 and 3,233,720 and commonly assigned U.S. application Ser. No. 270,030, now abandoned.

It should be noted that when discharging articles from the rotary disc conveyor the discharge conditions will not be the same whether the conveyor is moved in one direction or the opposite direction. Thus, in the example shown in FIG. 1 an article under final discharge, i.e. located adjacent the left hand side edge of the conveyor as seen in the moving direction A, will be moved by the discs not only in the transverse direction but additionally in the rearward direction of the conveyor run, while if the conveyor was moving in the opposite direction the additional movement component would be forwardly directed. In the latter case, therefore, the receiving station should normally have to be of increased length for ensuring safe receipt of the discharged articles.

In the embodiment shown in FIG. 1 the width of the conveyor is defined by the diameter of the discs 22, but if a larger width is desired it will be possible to arrange for two or even more parallel and adjacent rows of discs, whereby one disc row will convey an article crosswise to the next row, and so forth, this possibility being illustrated in FIG. 8.

Generally the invention provides for the possibility of conveying an article resting on a base consisting of rotatable discs partly overlapping each other, and it is not limited to any particular manner of arranging for the movement of the carrier elements themselves. A preferred embodiment, of course, will be the described belt or chain like arrangement, but it is within the scope of the invention to make use of a non-endless conveyor such as a movable platform provided with the rotary discs arranged in one or more rows. If the platform, as shown and designated 40 in FIG. 9, is freely movable in all directions the discharge therefrom will, of course, not be bound to take place transversely of the direction in which the platform is or has been moved. Also, discharging (and even charging by inversed rotation of the discs) may take place during stillstand of the disc carrier structure, and with the use of several parallel and adjacent rows of discs an article will be conveyable transversely across the disc rows, i.e. such an arrangement will constitute a real conveyor, shown and designated 42 in FIG. 10, which may be movable or stationary. According to this aspect of the invention there is generally provided, by means of the discs, an article carrier surface consisting of elements which are operable to effect article movement with a well defined direction along the carrier surface. In a stationary conveyor of this design, of course, the discs cannot be driven by virtue of the disc carrying elements being moved along rack means, but it will be appreciated that the design of suitable driving means for rotating the discs will be but a matter of ordinary skill only, so it is deemed unnecessary to show and describe special driving arrangements for this purpose.

What is claimed is:

1. A conveyor arrangement for conveying and unloading articles, comprising a train of consecutive article carrier elements moving in a main conveying direction, each of said carrier elements being provided with article supporting means arranged so as to be selectively movable crosswise to said main conveying direction for effecting unloading of an article resting thereon, characterized in that said article supporting means are consituted by rotary disc members, means are provided for rotatably mounting the rotary disc members on the article carrier elements, said rotary disc members being arranged on the article carrier elements so as to overlap each other in such a manner that each disc member is partly covered by a part of the preceding or the following disc member, means being provided for rotating the disc members selectively for effecting said unloading of an article resting on one or more of the disc members.

2. A conveyor arrangement according to claim 1, in which the consecutive article carrier elements are connected with respective links of a closed chain structure moving through a predetermined path, characterized in that the means for rotatably mounting the rotary disc members includes rotary shafts of uniform lengths, each shaft being rotatably held in a bearing means associated with said chain links so as to project upwardly therefrom slightly inclined with respect to a direction normal to a line of connection between centers of consecutive disc members whereby the rotary disc members are able to successively overlap each other despite their being arranged generally in a common horizontal plane.

3. A conveyor arrangement according to claim 1, wherein said means for rotating the disc members includes individual drive motors arranged at each article carrier element, and wherein a contact rail means is arranged in proximity to the carrier elements, a sliding shoe means is interposed between the driving motors and the contact rail means for selectively energizing the individual drive motors.

4. A conveyor arrangement according to claim 1, wherein said means for rotating said disc members includes a conically-shaped pulley means arranged at each disc member, and wherein means are provided for cooperating with said conical pulley means for selectively driving an associated disc member.

5. A conveyor arrangement for conveying and unloading articles, comprising a train of consecutive article carrier elements movable in a main conveying direction and connected with respective links of a closed chain structure moving through a horizontal path, each of said carrier elements being provided with article supporting means arranged so as to be selectively movable crosswise to said main conveying direction for effecting unloading of an article resting thereon, characterized in that said article supporting means are constituted by rotary disc members mounted on rotary shafts of uniform lengths so as to overlap each other in such a manner that each disc member is partly covered by a part of the preceding or the following disc member, means for rotating the disc members selectively for effecting said unloading of an article resting on one or more of the disc members, each shaft being rotatably held in bearing means associated with said chain links so as to project upwardly therefrom slightly inclined with respect to the vertical direction in such a manner that the discs are slightly inclined with respect to their common horizontal plane, whereby the rotary disc members are able to successively overlap each other despite their being arranged generally in said common horizontal plane.

6. A conveyor arrangement according to claim 1 characterized in that said means for rotating the disc members comprise at least one of a pulley and pinion means mounted in connection with a central carrier shaft of each disc member and elongated driving rack means mounted at at least one location along the moving path of the article carrier elements so as to be operable to be rollingly engaged by said rotating means, the diameter of which is smaller than the diameter of the disc members.

7. A conveyor arrangement according to claim 6, characterized in that it comprises at least two parallel, juxtaposed rows of the said disc members.

8. A conveyor arrangement according to claim 5, characterized in that said means for rotating the disc members comprise at least one of a pulley and pinion means monnted in connection with a central carrier shaft of each disc member and elongated driving rack means mounted at at least one location along the moving path of the article carrier elements so as to be operable to be rollingly engaged by said rotating means, the diameter of which is smaller than the diameter of the disc members.

9. A conveyor arrangement according to claim 8, characterized in that it comprises at least two parallel, juxtaposed rows of the said disc members.

10. A conveyor arrangement according to claim 5, characterized in that it comprises at least two parallel, juxtaposed rows of the said disc members.

11. A conveyor arrangement comprising a plurality of parallel, closely juxtaposed rows of rotary discs, means for rotatably mounting the discs of each row, said rotary discs being mounted so as to overlap each other in such a manner that each disc is partly covered by a part of the preceding or the following disc, and driving means being provided for selectively rotating the discs.

* * * * *